June 11, 1929.  A. T. SPONAR  1,717,327
AIR HEATING APPARATUS
Filed Dec. 16, 1926   6 Sheets-Sheet 1
FIG. I.
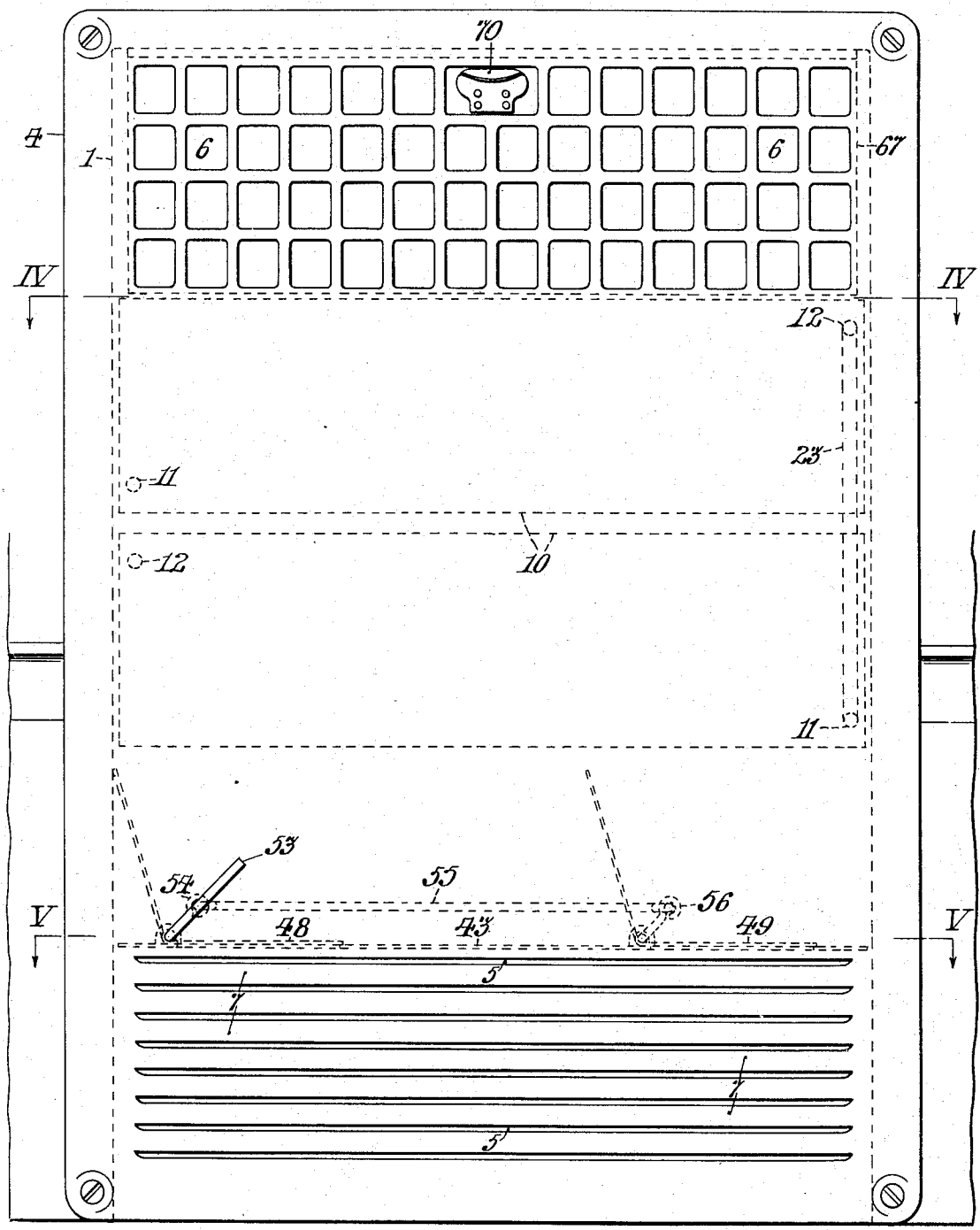
INVENTOR:
ALOYSIUS T. SPONAR,

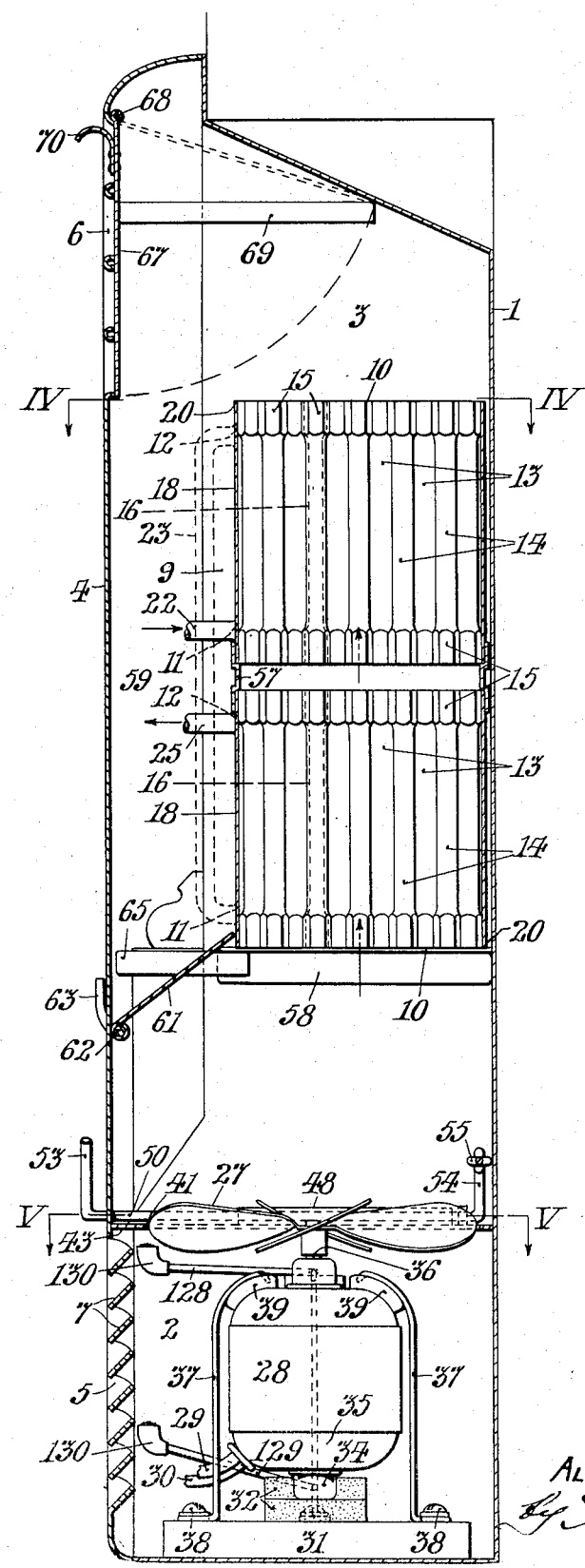

June 11, 1929. A. T. SPONAR 1,717,327
AIR HEATING APPARATUS
Filed Dec. 16, 1926 6 Sheets-Sheet 3
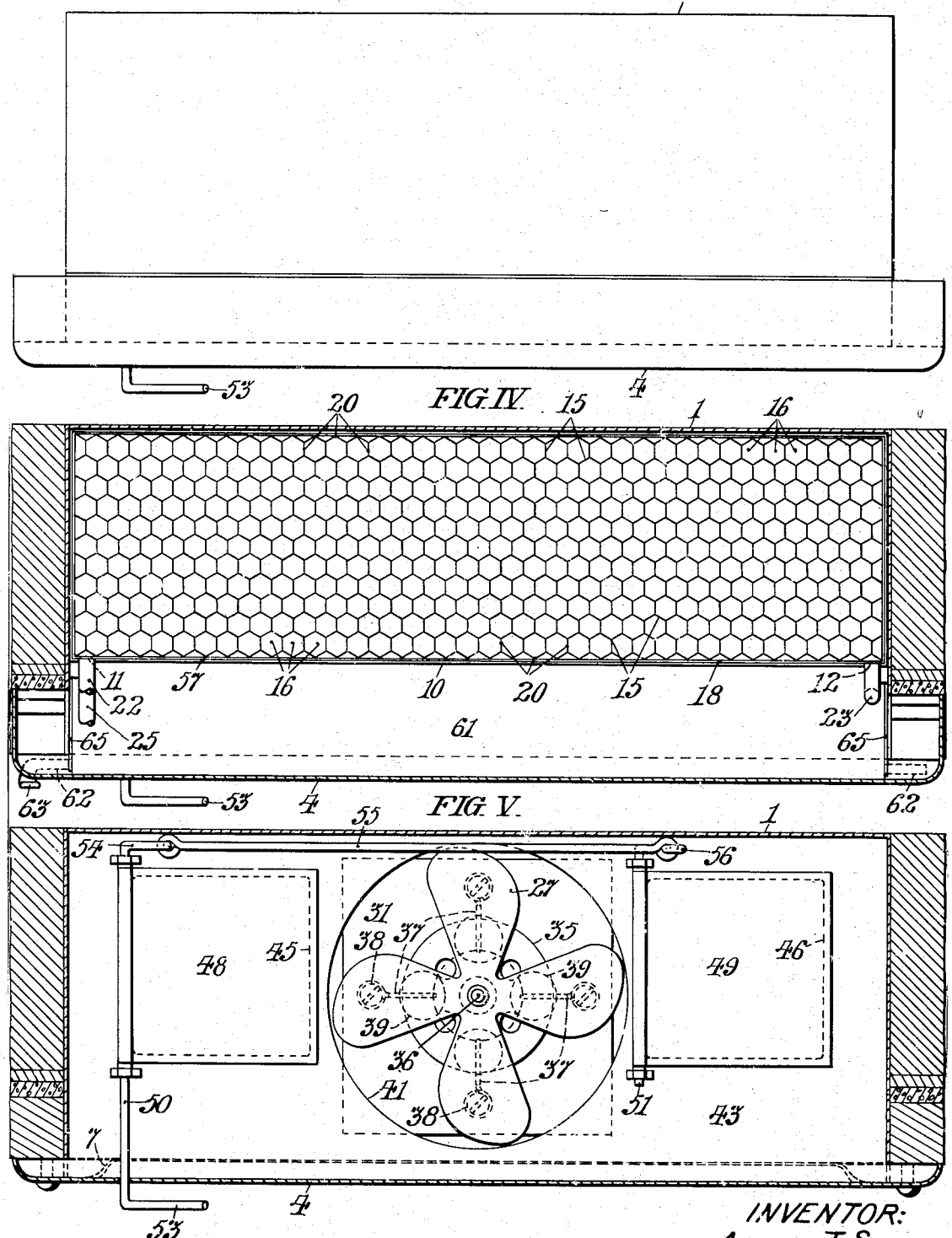
INVENTOR:
ALOYSIUS T. SPONAR,

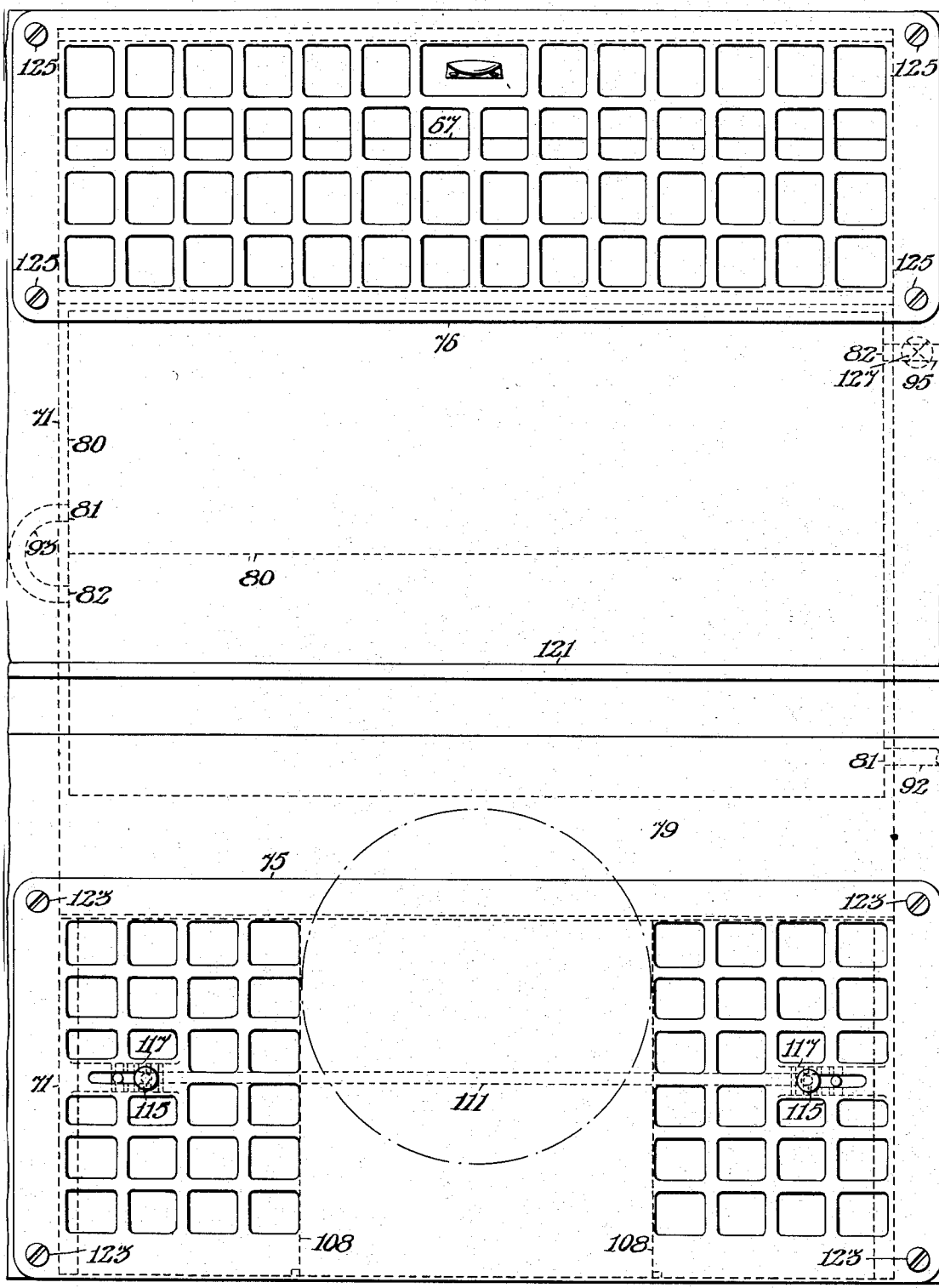
FIG. VI.

June 11, 1929.　　　A. T. SPONAR　　　1,717,327
AIR HEATING APPARATUS
Filed Dec. 16, 1926　　　6 Sheets-Sheet 5
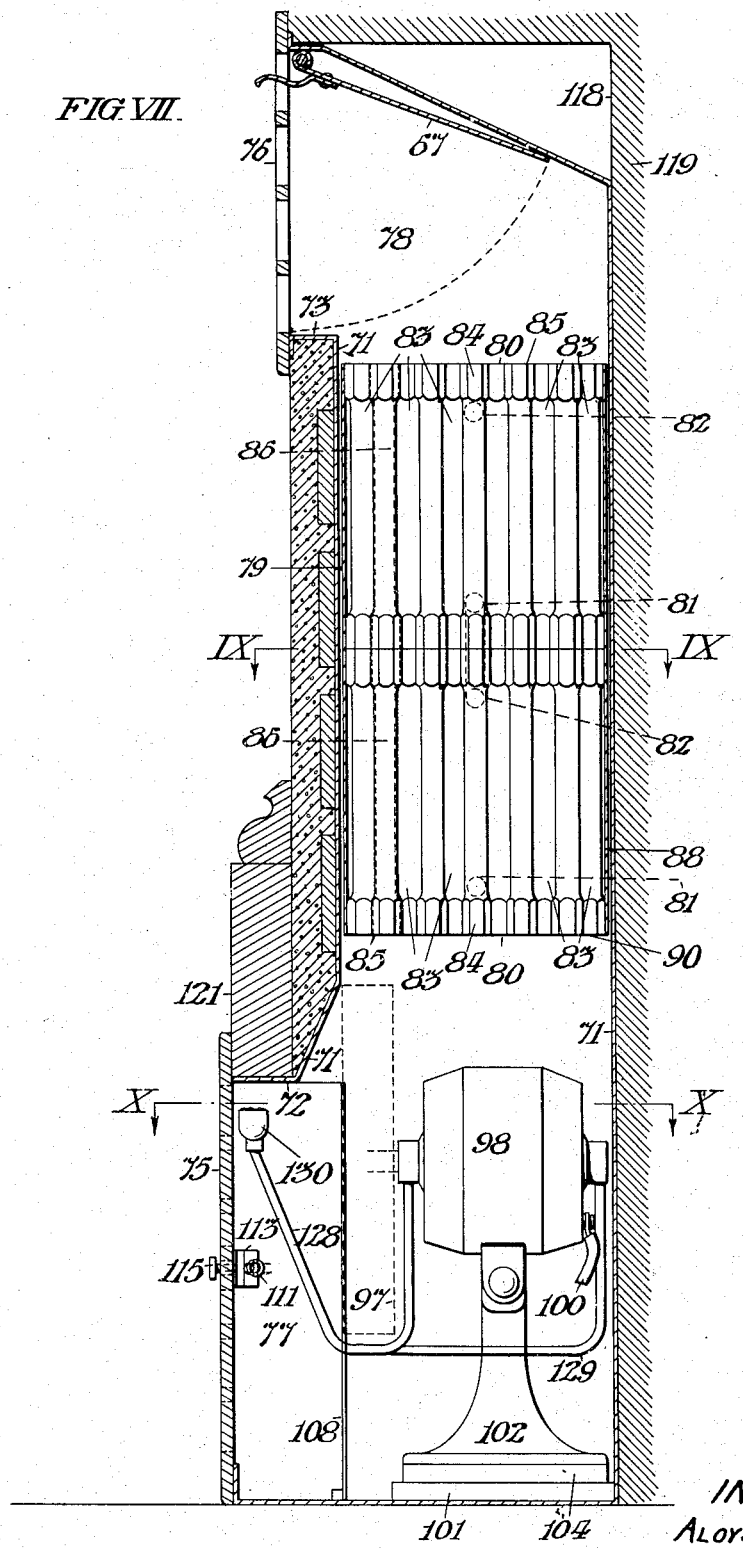
INVENTOR:
ALOYSIUS T. SPONAR, June 11, 1929.   A. T. SPONAR   1,717,327
AIR HEATING APPARATUS
Filed Dec. 16, 1926   6 Sheets-Sheet 6
FIG. VIII
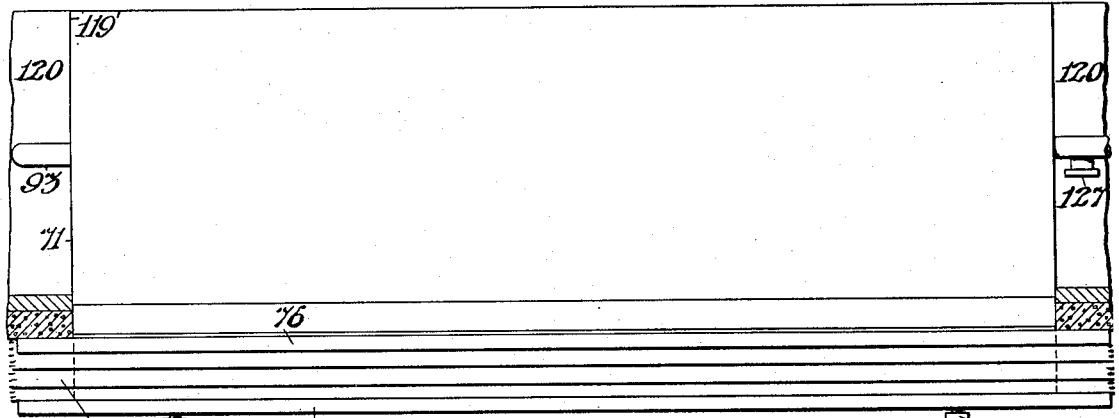
FIG. IX.
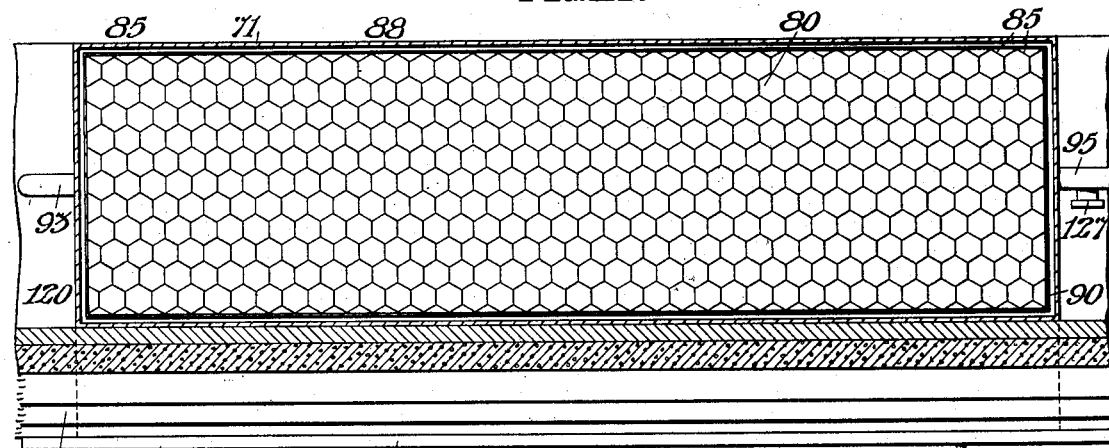
FIG. X.
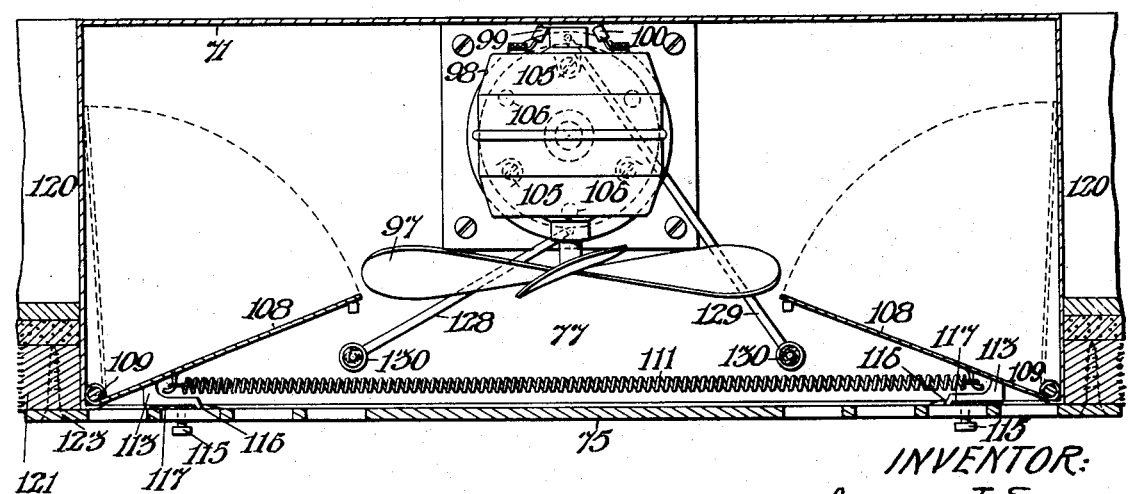
INVENTOR:
ALOYSIUS T. SPONAR, Patented June 11, 1929.

1,717,327

UNITED STATES PATENT OFFICE.

ALOYSIUS T. SPONAR, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA.

AIR-HEATING APPARATUS.

Application filed December 16, 1926. Serial No. 155,174.

It is the object and effect of my invention to provide a radiator of cellular structure, including thin sheet metal walls, preferably copper, forming separate passageways for a heat carrying fluid and a heat absorption fluid, and means for forcing circulation of fluid through said cellular structure.

As hereinafter described, my invention includes a cellular structure comprising a rectangular congeries of metal tubes having enlarged polygonal ends which fit together; a casting band at the perimeter of said congeries; means sealing the joints between the ends of said tubes and said casing means, forming a cellular honeycomb of thin metal walls comprising separate passageways for hot water or steam, and for atmospheric air; means forming an inlet port and an outlet port in communication with the passageways for the heating medium; an outer casing forming a cold air inlet chamber at the bottom thereof, an intermediate chamber containing said cellular structure, and an upper outlet chamber for the heated air; an electric motor, preferably mounted in said inlet chamber, with a fan arranged to force air into said outer casing and through said congeries of tubes and out from the heated air chamber, into the surrounding atmosphere.

Although it is desirable to direct all of the incoming air to the fan, while the latter is in operation, to impart maximum velocity to such air; the area traversed by the rotation of the fan blades is insufficient to afford passage for the desired volume of air when the fan is stationary. Therefore, I prefer to provide my improved radiator with means alternatively adjustable to direct all of the incoming air to the area traversed by the rotating fan blades, or to afford a much larger opening, permitting the passage of air aside from such fan area, when the fan is stationary, or when the only means for moving the air is the convection stresses due to increase in the temperature of the air by the heating medium.

My invention includes the various novel features of construction and arrangement hereinafter more definitely specified.

In said drawings; Fig. I is an outer face view of a radiator and its appurtenances embodying my invention as adapted to be set in a vertical wall at a floor level.

Fig. II is a vertical sectional view of the structure shown in Fig. I.

Fig. III is a plan view of said radiator structure.

Fig. IV is a plan sectional view of said radiator structure, taken on the line IV, IV in Figs. I and II.

Fig. V is a plan sectional view of said radiator structure, taken on the line V, V in Figs. I and II.

Fig. VI is an outer face view of a radiator and its appurtenances embodying a modified form of my invention as adapted to be set in a vertical wall at a floor level.

Fig. VII is a vertical sectional view of the structure shown in Fig. VI.

Fig. VIII is a plan view of said radiator structure shown in Fig. VI.

Fig. IX is a plan sectional view of said radiator structure, taken on the line IX, IX in Figs. VI and VII.

Fig. X is a plan sectional view of said radiator structure, taken on the line X, X in Figs. VI and VII.

Referring to the form of my invention shown in Figs. I to V inclusive; the outer casing 1, which is conveniently formed of galvanized sheet iron, includes the cold air inlet chamber 2 at the bottom thereof, and the hot air outlet chamber 3 at the top thereof. Said casing is conveniently provided with a removable face plate 4, formed of pressed sheet metal, having respective foraminous areas, including air inlet ports 5 in registry with said air inlet chamber 2, and air outlet ports 6 in registry with said outlet chamber 3; said ports 5 being conveniently formed by stationary louvers 7 which are pressed from the metal of said removable face plate 4.

Said inlet chamber 2 and outlet chamber 3 are separated by the intermediate chamber 9 containing one or more cellular structures 10. I have shown two such cellular structures 10, each having an inlet port 11 near the bottom and one end thereof and an outlet port 12 near the top and other end thereof, for ingress and egress of the heating medium which, as above contemplated, may be water or steam, supplied from a suitable heater.

Said inlets 11 and outlets 12 are preferably located at respectively opposite ends of said cellular structures 10, so as to insure that the heating medium traverses the entire space 13 which surrounds the congeries of individual tubes 14, which latter are primarily cylindriform but have their ends 15 enlarged to polygonal and preferably hexagonal form, so that when said ends are fitted together, as indicated in Fig. II, the cylindriform bodies of the tubes are in spaced relation to afford passageways 13 around and between them for the heating medium. Each of said tubes 14 forms a passageway 16, extending axially through it, for atmospheric air; such air passageways, of course, being separated, by the walls of said tubes, from the space 13 around the tubes, which is traversed by the heating medium.

I find it convenient to provide each such cellular structure 10 with casing means including a single band of sheet metal 18, bent to rectangular form and connected to said tubes 14 at their ends, by dipping the assembled cellular structure into molten solder or other suitable metal 20 capable of uniting them.

The supply conduit 22 extends from a suitable heater, supplying hot water or steam to the inlet port 11 of the upper structure 10, and the outlet port 12 of that structure 10 is connected by the coupling conduit 23 with the inlet port 11 of the lower structure 10; the outlet port 12 of the latter being provided with the exhaust conduit 25, through which the heating medium may be returned to the heater from which it was supplied; so that such heating medium may be continuously circulated through the space 13 in the radiator structure.

The construction and arrangement above described are such that when the space 13 is charged with a heating medium as above contemplated; the air in the passageways 16 is expanded and consequently rises by convection so as to induce a circulation of air through the inlet ports 5 into the inlet chamber 2 at the bottom of said casing 1; thence through said passageways 16, and out of the outlet chamber 3, through said outlet ports 6, at the top of said casing. However, I prefer to circulate the air more rapidly than it can be induced to circulate merely by convection and, therefore, provide the rotary fan 27 with the electric motor 28 within said cold air inlet chamber 2 and arranged to be energized by way of the electrical conductors 29 and 30.

In such a structure, there is a tendency for the fan 27 to transmit vibrations which generate sound which it is desirable to suppress. Therefore, an adjunctive feature of my invention is means for so supporting the fan as to minimize the transmission of such vibrations, to thus suppress such objectionable sounds. As best shown in Fig. II, I provide the casing 1 with a removable inner floor panel 31, which is conveniently formed of wood, and carries a socket 32 of sound deadening material, for instance, soft rubber or felt, which is fixed upon said panel 31 by any convenient means. Said socket is adapted to receive the lower bearing boss 34 of the motor casing 35 in which the armature and fan shaft 36 is journaled. Said casing is conveniently resiliently upheld with the axis of said shaft in vertical position, by a circular series of four flexible wire standards 37, the lower ends of which are rigidly connected with said floor panel 31, by screws 38, and the upper ends of which are respectively engaged with rings 39 of sound deadening material, for instance, soft rubber or felt, which bear against the upper end of said motor casing 35.

Said fan 27 is thus presented in the fan opening 41 intermediate of the width of said casing 1, in the horizontal diaphragm 43 which is conveniently formed of plane sheet metal set in said casing 1 and normally serving to insure that all of the air inlet to said casing through the ports 5 shall be forcibly driven upwardly, by said fan 27, through the passageways 16 in the congeries of tubes 14. However, in order to afford a larger passageway for the incoming air, when said fan is idle or omitted, I provide said diaphragm 43 with auxiliary openings 45 and 46, upon opposite sides of said fan opening 41. Said openings 45 and 46 are respectively provided with hinged louver valves 48 and 49 arranged to control the effective area thereof. Said valves are respectively hinged upon rock shafts 50 and 51, the former having the actuating handle 53 extending exterior to said casing 1 and having, at its inner end, the arm 54 connected by the link 55 with the arm 56 on said shaft 51; so that said valves may be simultaneously operated. It may be observed that when said valves are upturned to the position indicated in dash lines in Fig. I; they are overbalanced so as to remain open until positively closed by manipulation of said handle 53.

I find it convenient to leave the front of said casing 1 open, behind said face plate 4, and to detachably connect said cellular structures 10 by the band 57, and to support them upon the brackets 58 in said casing 1 and toward the rear of said casing, so as to afford a front chamber 59 in which the conduits aforesaid may extend. However, said chamber 59 would serve as a bypass, permitting the air to flow from the inlet chamber 2 to the outlet chamber 3, without traversing the passageways 16 through the heated tubes 14 unless means be provided to prevent such by-passage of the air. Therefore, I provide a hinged valve 61 which is mounted upon the rock shaft 62, journaled in said cover plate 4, and provided with the handle 63 exterior thereto, whereby it may be adjusted. Said valve is conveniently provided with a friction device to detain it in any position in which it may be set and conveniently consisting of a flat spring 65 which is attached at one end to a side wall of the casing 1 and in such position as to bear against the adjacent edge of said valve 61.

It is to be understood that the construction and arrangement above described are such that a predetermined and adjustably variable volume of air may be circulated through the heated tubes 14, as a heat absorption fluid, either by convection stresses or by forcible displacement of the air by the fan 27.

However, in order to conserve the heat in said radiator, when it is not desired, as, for instance, at night; I find it convenient to provide said air outlet 6 with the hinged valve 67 which is carried by the rock shaft 68 journaled in the cover 4 and normally upheld in open position by the spring 69 which is constructed and arranged like the spring 65 aforesaid. Said rock shaft 68 has the handle 70 extending exterior to said plate 4 whereby said valve 67 may be manually closed over the ports 6. Although I consider the form of my invention above described preferable, in that it is economical to construct, install and repair; it being only necessary to leave in the building wall a recess between adjoining studding timbers, of sufficient width and height to receive the casing 1; which is entirely covered by the removable face plate 4; I do not desire to limit myself to such construction and arrangement, as the essential features of my invention may be otherwise embodied. For instance, the radiator casing may be permanently set behind the usual lath and plaster finish of the wall, which may be papered or painted intermediate of the air inlet and outlet ports; such ports being provided with separate foraminous cover plates. Moreover, the fan may be disposed with its axis of rotation horizontal, and shielded from tampering, by a blank portion of the face plate. Furthermore, the auxiliary air openings may be controlled by valves without the provision of the horizontal diaphragm aforesaid. I have shown such a modified form of my invention in Figs. VI to X inclusive, wherein the outer casing 71, which is conveniently formed of galvanized sheet iron, includes the cold air inlet 72, at the bottom thereof, and the heated air outlet 73 at the top thereof; said inlet and outlet being respectively provided with foraminous face plates 75 and 76, conveniently formed of cast iron. Said casing comprises the cold air inlet chamber 77 and the outlet chamber 78, separated by the intermediate chamber 79 containing one or more cellular structures 80. I have shown two such cellular structures 80 each having an inlet port 81 at the bottom thereof and an outlet port 82 at the top thereof for ingress and egress of the heating medium which, as above contemplated, may be water or steam, supplied from a suitable heater. Said inlet and outlet are preferably located at respectively opposite sides of said cellular structures, so as to insure that the heating medium shall traverse the entire space 83 which surrounds the congeries of individual tubes 84 which are primarily cylindriform but have their ends 85 enlarged to polygonal, and preferably hexagonal, form, so that when said ends are fitted together, the cylindriform bodies of the tubes are in spaced relation to afford passageways 83 around and between them for the heating medium. Each of said tubes forms a passageway 86, extending axially through it, for atmospheric air, such air passageways, of course, being separated by the walls of said tubes, from the space 83 around the tubes, which contains the heating medium.

I find it convenient to provide each such cellular structure with casing means including a single band of sheet metal 88 bent to rectangular form and connected with said tubes at their ends by dipping the assembled cellular structure into molten solder or other suitable metal 90 capable of uniting them.

The supply conduit 92 extends from a suitable heater supplying hot water or steam, to the inlet of the lower structure 80, and the outlet of that structure is connected by the coupling conduit 93 with the inlet of the upper structure; the outlet of the latter being provided with the exhaust conduit 95, through which the heating medium may be returned to the heater from which it was supplied; so that such heating medium may be continuously circulated through the space 83 in the radiator structure.

The construction and arrangement above described are such that when the space 83 is charged with a heating medium as above contemplated; the air in the passageways 86 is expanded and consequently rises by convection so as to induce a circulation of air into the inlet 72 at the bottom of said casing 71 and out of the outlet 73 at the top of said casing. However, I prefer to circulate the air more rapidly than it can be induced to circulate merely by convection and, therefore, provide the rotary fan 97 with the electric motor 98 within said cold air inlet chamber 77, and arranged to be energized by way of the conductors 99 and 100. In such a structure, there is a tendency for the fan to transmit vibrations which generate sound which it is desirable to suppress. Therefore, an adjunctive feature of my invention is means for so supporting the fan as to minimize the transmission of such vibrations to thus suppress such objectionable sounds. As best shown in Fig. VII; I provide the casing 71 with an inner floor panel 101, of sound deadening material, for instance, soft rubber or felt; and interpose between said panel and the base 102 of the fan motor, a mat 104 also of suitable sound deadening material, and connect said fan base with said mat and the latter with said panel, conveniently by respective rivets 105 and 106; so that there is no direct metallic connection between said fan base and said casing 71.

In order to shield said fan from being tampered with through said plate 75; I may provide the latter with an imperforate portion in front of the fan. In order to insure that all of the air inlet to said casing 71 shall be progressed therethrough by such fan; I find it convenient to mount in said chamber 77, at respectively opposite ends thereof, two oppositely counterpart louver valves 108, which are hinged upon vertical axes coincident with shafts 109 supported in said casing 71. Said valves are provided with spring means 111 which normally hold them in position to direct all of the incoming air to the area traversed by the rotation of said fan 97. However, in order to afford a larger opening for the incoming air, when the fan is idle or omitted, I provide means for adjusting said valves 108 to the position indicated in dotted lines in Fig. X and conveniently comprising slides 113 provided with respective handles 115 and having pawl members 116 adapted to selectively engage ratchet lugs 117 which may be cast upon said face plate 75. The arrangement is such that said spring 111 tends to hold said slides 113 in any position in which they are set, but they may be disengaged by pressing them inwardly against the stress of said spring.

I have found it convenient to illustrate my invention in a radiator structure adapted to be set in a recess 118 in a vertical wall 119, between adjoining studding timbers 120 and with the air inlet port to said casing presented in the baseboard 121 of said wall, to which baseboard said plate 75 may be conveniently secured by screws 123. The face plate 76 may be connected by screws 125, with the casing 71, so as to be supported in proper position in said wall, but independently of the latter, or said plate may be otherwise supported in connection with the wall. However, it is to be understood that a radiator structure otherwise having the characteristics above described, may be mounted upon a side wall, or upon a floor or ceiling, without being set in a recess therein.

Moreover, I find it convenient to provide vents 127, which may be of any convenient construction, movable to permit the escape of air which otherwise might be trapped in the cellular structures aforesaid. Furthermore, I find it convenient to provide means for oiling the bearings of the armature shafts of the motor aforesaid, accessible from the exterior of the respective radiator casings and preferably tubes 128 and 129 which may have cups 130 at their outer ends containing wicking which excludes dust.

I do not desire to limit myself to the precise details of construction and arrangement herein set forth, as it is obvious that various modifications may be made therein without departing from the essential features of my invention, as defined in the appended claims.

I claim:

1. In a radiator, the combination with an outer casing having an air inlet chamber at the bottom thereof and an air outlet chamber at the top thereof; of a cellular structure including air passageways between said inlet and outlet, surrounded by passageways for a heating medium; and a fan in said casing; whereby, air may be heated in and circulated through said radiator and means arranged to normally direct all of the incoming air to the area traversed by said fan, but adjustable to afford a larger opening for incoming air.

2. A radiator as in claim 1; wherein the means arranged to direct the incoming air include a pair of louver valves, pivoted in said casing upon respectively opposite sides of said fan.

3. A radiator as in claim 1; wherein the means arranged to direct the air include a pair of louver valves; and link means operatively connecting said valves, whereby they may be simultaneously operated.

In testimony whereof, I have hereunto signed my name at Conshohocken, Pennsylvania, this twenty-second day of November, 1926.

ALOYSIUS T. SPONAR.